United States Patent [19]
Colucci

[11] Patent Number: 6,016,768
[45] Date of Patent: Jan. 25, 2000

[54] ANIMAL GUARD FOR BIRD FEEDER POLES

[76] Inventor: Peter Francis Colucci, 18 Hinkley Rd., Shandaken, N.Y. 12480

[21] Appl. No.: 09/363,830

[22] Filed: Jul. 30, 1999

[51] Int. Cl.<sup>7</sup> ..................................................... A01K 15/00
[52] U.S. Cl. .............................................................. 119/57.9
[58] Field of Search ..................................... 119/467, 468, 119/469, 52.3, 57.9, 713, 903; 52/101; 256/11, 12

[56] References Cited

U.S. PATENT DOCUMENTS

| | | | |
|---|---|---|---|
| 168,446 | 10/1875 | Blodget | 52/101 |
| 2,133,637 | 10/1938 | Shulman | 119/467 |
| 2,887,730 | 5/1959 | Bittner | 52/101 |
| 4,031,856 | 6/1977 | Chester | 119/52.3 |
| 4,309,072 | 1/1982 | Tweeddale | 52/101 |
| 5,596,834 | 1/1997 | Ritter | 52/101 |
| 5,615,524 | 4/1997 | Costa, Sr. | 52/101 |
| 5,648,641 | 7/1997 | Guthrie | 52/101 |

*Primary Examiner*—Thomas Price

[57] ABSTRACT

An animal guard appliance for bird feeder poles comprised of a hollow cylindrical plastic base. Outwardly projecting tacks protrude from the base. The base is secured to the pole by self-threading screws. The tacks are secured to the base by piercing them through flexible vinyl, which is glued to the exterior of base. The majority of the base is covered with tacks preventing animals from climbing over it. The animal guard is especially effective in keeping squirrels from climbing feeder poles.

4 Claims, 1 Drawing Sheet

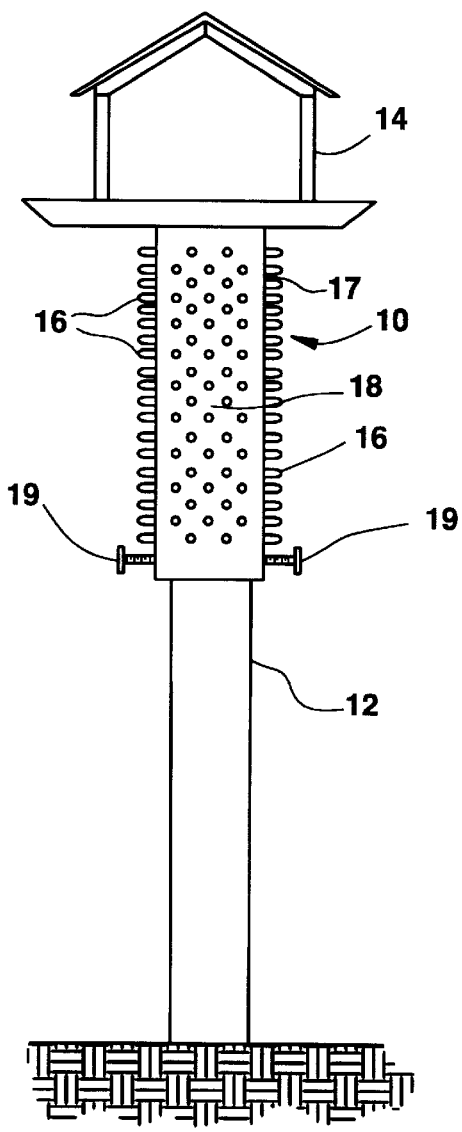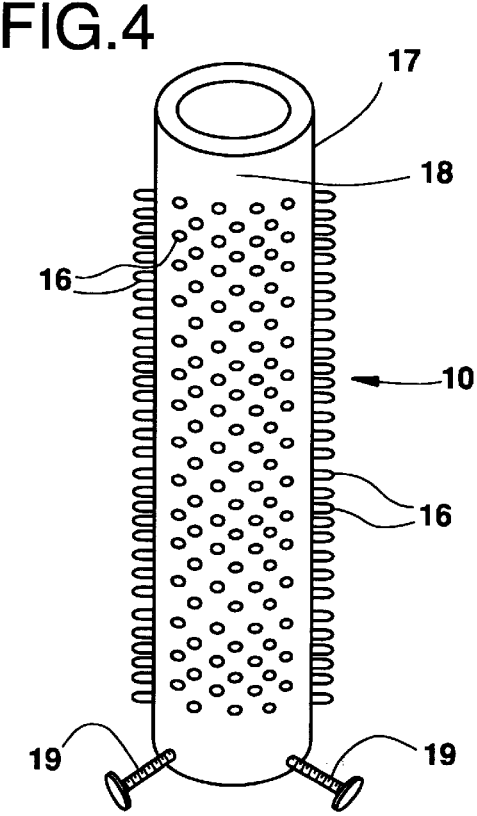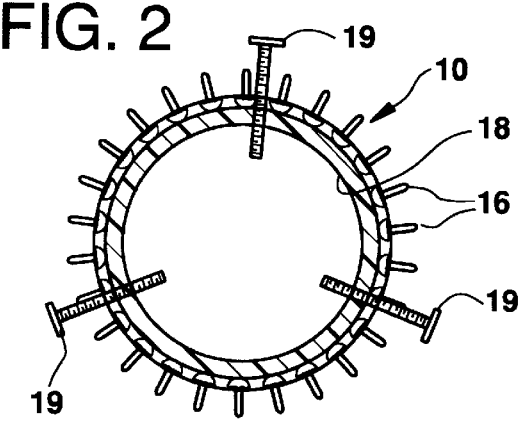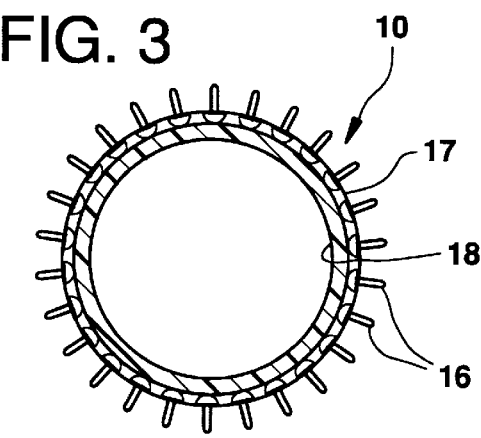

ANIMAL GUARD FOR BIRD FEEDER POLES

CROSS REFERENCE TO RELATED APPLICATIONS

Watching and feeding birds has become a favorite pastime for many people, however the need to deter small animals, and more specifically squirrels, from feeders is apparent. The following searches are various attempts on anti-climbing devices.

U.S. Pat. No. 1,996,894, issued Apr. 9, 1935 to Alvord, describes an anti-climbing device for electric transmission towers. It is comprised of barbs welded to angles at least 4 inches long and secured to similar angles members of the tower making it difficult for anyone to not be scratched considerably while climbing over them.

U.S. Pat. No. 3,362,115 issued Jan. 9, 1968 to Nyhus Et Al, is of an animal deflector for guy wires. A helical, cut, cylindrical, plastic sheath with staples projecting outward is wrapped over guy wires to prevent cattle from scratching their hides.

U.S. Pat. No. 3,400,503, issued Sep. 10, 1968 to Schaller, is a protective device to discourage climbers from scaling structural members and electrical transmission lines. A plurality of opposite facing sharp tooth like sheet metal spikes placed over various structural members.

U.S. Pat. No. 3,611,651 issued Oct. 12, 1971 to Carlson, of a guy wire animal guard to keep cattle from rubbing up against them. Similar to Nyhus U.S. Pat. No. 3,362,115 only a different method of fabrication in securing. A two-part construction with semi-circular ends being clamped together, also with protruding barbs.

U.S. Pat. No. 4,110,944 issued Sep. 5, 1978 to Carlson, is an animal protective guard for protecting pedestals for underground telephone lines. Barbs are mounted on a movable support arm, both to protect against animals and to be moved by workpeople.

U.S. Pat. No. 4,309,072 issued Jan. 15, 1982 to Tweeddale, of cable protection from rodents. It incorporates a protective sheath with a plurality of plastic spikes on the outer layer and inner jacket of sheath covers fiber optic cables.

U.S. Pat. No. 5,003,734 issued Apr. 2, 1991 to Dinsmore, is of an animal guard for posts using a tube with outwardly facing fins to minimize animals to grasp and climb poles.

STATEMENT OF FEDERALLY SPONSORED RESEARCH/DEVELOPMENT

Not Applicable

REFERENCE TO MICROFICHE APPENDIX

Not Applicable

BACKGROUND OF THE INVENTION

The present invention relates to an animal guard deterring sheath which prevents squirrels and other small animals from climbing poles and removing feed intended for birds from bird feeders on top of said poles.

BRIEF SUMMARY OF THE INVENTION

The principal object of the present invention is to provide an animal guard for feeder poles and the like.

It is a general object of the present invention to provide an inexpensive, lightweight animal guard with minimal installation.

It is a specific object of the present invention to provide a hollow cylindrical plastic tubing which slides over the top of poles and fastens at a point just under feeders and incorporates outwardly projecting tacks to repel squirrels or other rodents.

Further objects, advantages and features will become more apparent after considering the following detailed description along with the annexed drawings and appended claim.

BRIEF DESCRIPTION OF THE SEVERAL VIEWS OF THE DRAWINGS

FIG. 1 shows an animal guard deterror in accordance to the present invention as installed on a feeder pole.

FIG. 2 is an enlarged bottom end view of the animal guard appliance of FIG. 1.

FIG. 3 is an enlarged top end view of the animal guard appliance of FIG. 1.

FIG. 4 shows a plan view of the animal guard appliance of FIG. 1.

DETAILED DESCRIPTION OF THE INVENTION

Referring now to the drawings and to FIG. 1 there is shown an animal guard appliance 10 secured over a pole 12 supporting a bird feeder 14. The appliance 10 comprises a hollow cylindrical base 18 enclosing the pole 12 over an adequate segment of the pole 12 to protect the feeder 14 by deterring squirrels or other small animals by outwardly projecting tacks 16 fastened to the cylindrical base 18.

Referring further to the appliance 10 the cylindrical base 18 is a hollow PVC or similar plastic having an internal diameter no greater than that of the pole 12. The base 18 is lightweight, rigid PVC plastic, adding no significant weight to the pole 12.

The length of the cylindrical base 18 being twenty-four inches long has been found to be sufficient when mounted just below feeder 14.

Preferably, the base 18 is constructed of white PVC plastic is highly visible and can easily be seen by humans to prevent them from running into the appliance or the pole. A clean white appearance is achieved.

Base 18 is wrapped with a 16 gauge flexible vinyl 17 which has been impregnated with a plurality of ⅜ inch galvanized tacks 16 and glued to base 18. The clear vinyl and glue do not interfere with the white appearance, because they are transparent.

The galvanized tacks 16 are first impregnated through the clear vinyl 17. The impregnated vinyl 17, with tacks 16, being glued to base 18 affords tacks 16 to be supported by base 18, making base 18, clear vinyl 17 and tacks 16 a solitary unit to easily be slipped over pole 12.

The tacks 16 protrude ⅜ inches outwardly from base 18, being spaced approximately every ½ inch, but cover only twenty inches of entire twenty-four inch length, leaving a two inch unimpregnated area at top and bottom of base 18 for safe handling.

Base 18 is fastened to pole 12 by three self-threading screws 19 at bottom of base 18.

What has been described herein is an effective, economical animal guard with ease of installation.

What is claimed is:

1. An animal guard in combination with a bird feeder pole comprising:
   (a) a cylindrical, hollow body attached over said pole, and
   (b) a clear, flexible vinyl impregnated with 3/8 inch outwardly projecting galvanized tacks glued to said body.

2. An animal guard, as defined in claim 1 which includes a plurality of tacks over majority of surfaces of guard to repel squirrels and other small animals.

3. An animal guard, as defined in claim 1 wherein the plurality of tacks prevent animals from climbing over their surfaces.

4. An animal guard, as described in claim 1 wherein animal guard is completely adjustable on said pole.

* * * * *